(12) United States Patent
Lohr et al.

(10) Patent No.: US 7,600,621 B2
(45) Date of Patent: Oct. 13, 2009

(54) HIGH SECURITY DEVICE FOR CAPTURING ELECTRIC ENERGY ON THE GROUND FOR SUPPLYING A LANDBORNE VEHICLE

(75) Inventors: Robert Lohr, Hangenbieten (FR); René Donnard, Westhoffen (FR)

(73) Assignee: Lohr Industrie, Hangenbieten (FR)

( * ) Notice: Subject to any disclaimer, the term of this patent is extended or adjusted under 35 U.S.C. 154(b) by 465 days.

(21) Appl. No.: 10/576,442

(22) PCT Filed: Oct. 13, 2004

(86) PCT No.: PCT/FR2004/002607

§ 371 (c)(1),
(2), (4) Date: Jun. 1, 2006

(87) PCT Pub. No.: WO2005/042295

PCT Pub. Date: May 12, 2005

(65) Prior Publication Data

US 2006/0286830 A1    Dec. 21, 2006

(30) Foreign Application Priority Data

Oct. 20, 2003    (FR)    .................................. 03 12259

(51) Int. Cl.
*B60M 1/00*    (2006.01)
(52) U.S. Cl. .................... 191/23 R; 191/30; 191/31; 191/32; 191/25; 191/49; 104/140; 104/146
(58) Field of Classification Search .................... 191/25, 191/23 R, 24, 26, 23 A, 22 C, 48, 49; 104/139, 104/140, 142, 145, 146; 439/110, 113, 114, 439/119, 120
See application file for complete search history.

(56) References Cited

U.S. PATENT DOCUMENTS

| | | | | |
|---|---|---|---|---|
| 592,711 A | * | 10/1897 | Luer ........................... | 191/48 |
| 3,848,712 A | * | 11/1974 | Flodell ........................ | 191/30 |
| 4,083,439 A | * | 4/1978 | Chandler ..................... | 191/31 |
| 5,960,717 A | * | 10/1999 | Andre ......................... | 104/139 |

FOREIGN PATENT DOCUMENTS

| | | |
|---|---|---|
| DE | 25 19 976 | 11/1976 |
| ES | 2 021 538 | 11/1991 |
| FR | 2735728 | 12/1996 |
| JP | 62 181929 | 8/1987 |

* cited by examiner

*Primary Examiner*—Mark T Le
(74) *Attorney, Agent, or Firm*—Davis & Bujold, P.L.L.C.

(57) ABSTRACT

The device for capturing electrical energy having a capturing plough-type element (10), an arm for holding the capturing plough-type element on the frame of the vehicle, a mechanism for lifting up the plough-type element and the way for electrical connection to the supply circuit of a vehicle. The plough-type element is electrically insulated in relation to the ground and the trackway. One part of the plough-type element separates two profiled part holders (23, 24) which are arranged beside each other in another opposite manner and are supported a support. The conducting elements of the lower end of the plough-type element are maintained in electrical contact, sliding along polar parts born by each part holder. Along the entire length of each part holder (23, 24), each part holder is mounted in an elastically recoiling manner such that it moves towards its adjacent opposite number with the aid of an elastic mechanism.

20 Claims, 3 Drawing Sheets

HIGH SECURITY DEVICE FOR CAPTURING ELECTRIC ENERGY ON THE GROUND FOR SUPPLYING A LANDBORNE VEHICLE

This application is a national stage completion of PCT/FR2004/002607 filed Oct. 13, 2004 which claims priority from French Application Serial No. 0312259 filed Oct. 20, 2003.

FIELD OF THE INVENTION

The present invention concerns a double security device for collection of electrical energy at ground level for feeding a land-borne vehicle, notably a land-borne vehicle for the transportation of passengers or merchandise, urban public transportation on wheels or on rails, or an industrial maintenance car.

BACKGROUND OF THE INVENTION

The invention is particularly adapted to the electrical feed of an urban public transportation vehicle on a fixed guideway with electric propulsion. This vehicle being either of the rail or tire type. However, the invention is not limited to this preferred application.

This type of electrical propulsion or traction vehicle is normally supplied with energy by above-ground cables or catenaries set out above its traffic lanes.

However, the current trend is, for aesthetic or other reasons, to get rid of these electrified aerial lines and replace them by feed systems at ground level or by buried lines.

We are thus confronted with a major safety problem. In fact, these vehicles require for their feed, a continuous current at relatively high voltage which can be extremely dangerous for human beings.

The system for collecting electrical energy at ground level must therefore of necessity be protected so as to render impossible a voluntary or accidental contact with the feed conductors and the polar parts, and thus ensure the safety of passengers, pedestrians, other users of the roadway or personnel in the case of a plant car.

SUMMARY OF THE INVENTION

The objective of the invention is to provide a system for collecting electrical energy at ground level which is perfectly safe, and usable for these types of vehicles.

Already known from patent FR 2.735.728 in the name of the applicant, is an electrical feed and guidance assembly along a rail at ground level for an urban transportation vehicle on wheels.

This assembly consists of a visiting, raiseable guidance support, which carries a pair of guide rollers in a <<"V">> shape, co-operating with a rail in the ground which has a central core that is used as a rolling track by the guide rollers and the electrical feed conductors.

The central core has flexible covering parts which constitute a linear closing of the space enclosing the conductors outside of the area for the passage of the guidance support which causes the momentary opening of this closing to the passage of the contact parts supported by the conductors.

The conducting parts of the former electrical feed systems are protected by flexible covering parts which only rise locally when the vehicle's guidance head passes.

Though it offers increased insulation of the energy collection system, this earlier device is not perfectly secure. In fact, the parts under voltage could be reached without too much difficulty in the event of malicious or accidental insertion of a long metallic item under one of the flexible covering parts.

In order to ensure a greater level of safety, the device for the collection of electrical energy at ground level according to the invention consists of a collection blade carried by a stay arm connected to the vehicle, which has, at its lower extremity, parts that are electrically connected to the vehicle's feed circuit, this blade being electrically insulated from the ground in the lane structures.

In addition, buried in the ground it has two linear polar parts in two holding fixture sections installed side-by-side opposite, running along the lane and carried by a carrier type support with a bottom that is more or less flat, and with two lateral walls.

According to one essential characteristic of the invention, each of these holding fixtures is equipped over its entire length with elastic recall return towards its adjacent counterpart by means of a linear elastic compressible device housed between the holding fixture and the corresponding lateral wall of the carrier support device. The passage of the vehicle results in the local spreading of the two holding fixtures by the lower part of the collection blade, and during the entire run, the conducting parts of the blade are maintained in continuous electrical contact by sliding along the linear polar parts.

Preferably, the linear elastic means which generates the recall force by bringing the two opposing holding fixtures together is, in each case an elastic tubular body, capabable of being compressed laterally, housed in the existing space between the holding fixture and the corresponding lateral wall of the carrier support.

This method of elastic recall forces the two holding fixtures to approach one another. It thus ensures good contact between the polar parts and the conducting parts of the blade when it is present. In the absence of the vehicle or in the areas where the blade is absent, it pushes these two holding fixtures against one another until they come into contact and lock fully, thus closing off access to the dangerous polar components.

The isolation and protection of the parts under voltage already ensures the first level of safety.

In order to further enhance safety, it could in addition be arranged that the ground level above the polar parts be protected electrically by an insulation covering which would open locally by the passage of the blade and then close again.

The energy collecting device according to the invention thus presents a double level of safety, thereby rendering it perfectly reliable.

BRIEF DESCRIPTION OF THE DRAWINGS

Other characteristics and advantages of the invention will become apparent in the description which follows, given by way of example and accompanied by drawings in which.

DETAILED DESCRIPTION OF THE INVENTION

Figure 1:
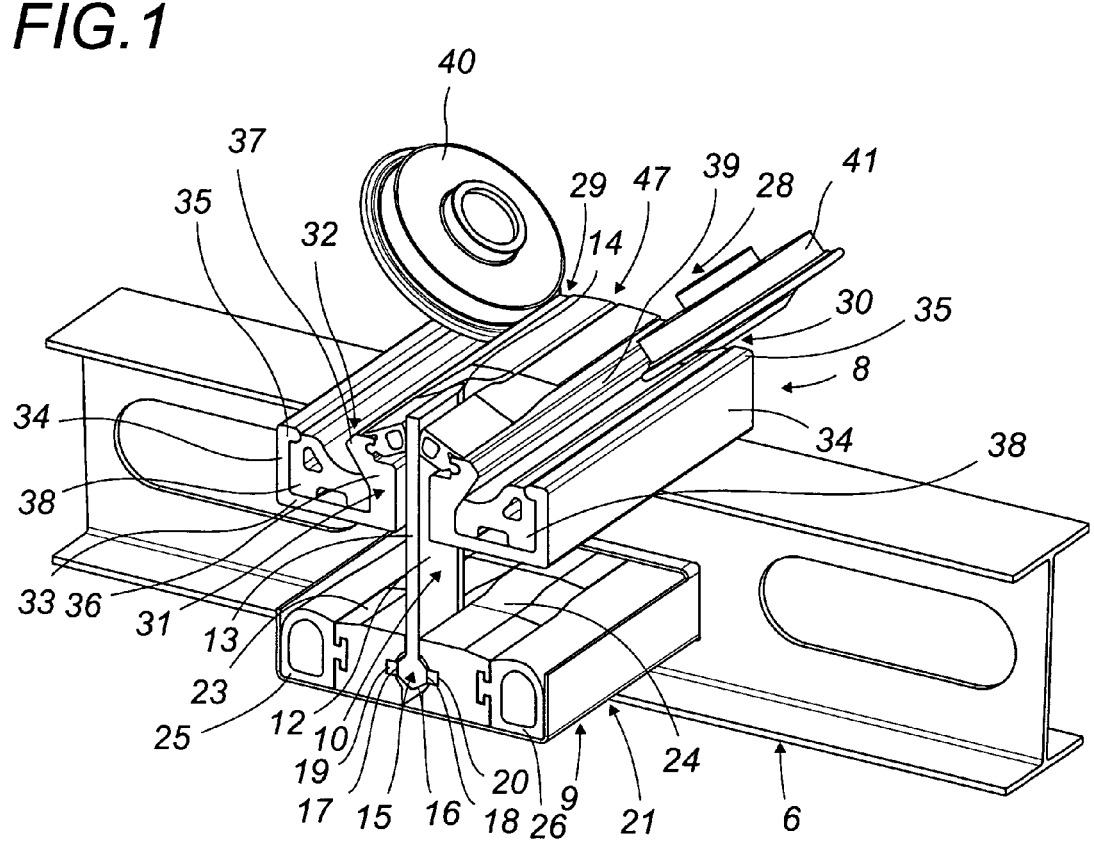
FIG. 1 is a general perspective view of the ground level collection device according to the invention when the collection blade is passing in the case of a variation which uses two guidance semi-rails.

The ground level electrical energy collecting device according to the invention can be used in numerous applications in the field of transportation and that of maintenance, for example, electric cars fed from ground level circulating about in shops, and urban public transportation vehicles on rails or fixed guideways on tires being fed with electrical energy at ground level.

The device according to the invention is mounted directly on the ground or in a trench dug into the ground between two rails, or between the two rolling tracks of an electric landborne vehicle.

It can also be mounted on an infrastructure, secured at a shallow depth on prepared ground, with this infrastructure being developed longitudinally to comprise an actual lane 1 formed of two rails, or of two paths 2 and 3, a lane on which vehicles travel and comprised of two caissons 4 and 5 connected at intervals, for example regular, by cross members such as 6. The caissons 4 and 5 are opened on the upper part to receive as a covering, plates such as 7 for example, ribbed or grooved which, by their succession, form paths 2 and 3. These caissons preferably contain the different electrical cables for feeding the vehicle traction energy, but also for safety and signaling. These cables run through the length of the caissons and can exit them at determined locations. According to the implementation method represented, the cross members 6 carry in the upper central part, a ground level guidance assembly 8 and below through their core, a collection assembly 9 carrying the polar parts.

The device according to the invention has the following general attributes.

A conductor element in the form of a blade 10 is carried in an insulated manner by a holding support 11, arm or other, supplied with an articulated joint on the vehicle, and connected in a removable manner, for example by a connector, to the extremity of an electrical connection with the feed circuits of the vehicle's electrical motive source. This technical characteristic of the electrical connection is not represented in the drawings.

This blade 10 constitutes the main element for the collection of electrical energy while the vehicle is moving, as a result of its continuous electrical contact with the polar parts. Based on this fact, it will henceforth be called the collection blade.

For this purpose, a part of the blade, for example the base of this component or its lower extremity, is shaped or adjusted to produce continuous sliding contact along the polar parts integrated in a set-back fashion in the linear flexible bodies of the holding fixture, which spread apart when the blade passes, then fully lock up against one another laterally after the blade has passed, as a result of a linear elastic recall return.

More specifically, according to the preferred implementation represented, the blade 10 is in the form of a vertical piece 12 in the shape of a blade, of a sufficient thickness to ensure good mechanical rigidity, but remaining flexible, and having a flat back edge 13, and a front beveled edge 14. The blade 10 must, however, have a flexibility that is sufficient to resist possible movements due to rolling and other causes that occur when the vehicle is moving.

The shape of the upper extremity of this blade 10 depends upon the type of electrical and mechanical connection to the vehicle's carrier support 11. A part of this blade, for example the lower extremity, is used for the collection of electrical energy. Its exact shape depends on that of the polar parts with which it must come into continuous electrical contact when the vehicle is in motion.

Support 11, or its mechanical connection, is formed or designed in such a way that the blade can be raised.

According to the non-limiting example of the shape represented in the Figs., the lower extremity is solid and spreads out in the form of a longitudinal block 15 with a polygonal cross-section, for example with six sections or faces, four of the large faces of which are inclined as in 16, and two edge faces 17 and 18 are conducting and in both cases, offer flat contact surfaces with one of the linear polar surfaces opposite to the polar parts or the respective conductors 19 and 20 for the purpose of capturing the electrical energy by a continuous sliding contact with them.

The polar parts or conductors 19 and 20 are electrically connected to the same phase, but can just as well be supplied individually from two different phases as from the same source. This presumes a composite structure of the blade according to which each part is insulated electrically and is connected to a distinct conductor component.

The collection assembly at ground level 9 of the device according to the invention is developed linearly along the lane and is installed in a support section 21 which has electrical feed connections at intervals the electrical feed connections to two polar parts 19 and 20, for example, from cables that are strung in, and along the caissons 4 and 5.

The support section 21 is in the form, for example, as illustrated in the drawings, of a flat-bottomed trough 22 with a more or less rectangular cross-section opened upward, or partially closed. To reduce the risks of accident, this support section 21 is preferably buried to a reasonable depth in relation to the vehicle's travel lane.

Advantageously, a water evacuation system connected to drainage to the ground can be provided in the bottom wall 22 of the trough 21.

Polar parts 19 and 20, connected or not to the same phase, are made, for example, of conductive bars, each of which is immobilized in the corresponding slot holding fixture 23 and 24 running along the support 21 of the trough. The conductive bars shown in the slots of the holding fixture are each offset in relation to the adjacent face of the trough. These holding fixtures are mounted unattached in the trough support 21 and can thus be moved laterally, being supported by the bottom of this element.

The holding fixture sections 23 and 24 are linear blocks produced in insulating material with a cross-section, for example that is more or less square or rectangular, occupying the major part of the interior space of the trough 21 between the two lateral walls which delimit its interior space.

Within the interior space of the trough, between each holding fixture 23 and 24 and the adjacent lateral wall is a housed an elastic recall return for the holding fixtures, 25 or 26, for example a hollow tube made of an elastomer or other equivalent material, which can withstand a local lateral crushing or compression and generate in return a lateral reaction force producing an elastic recall return of the two holding fixtures 23 and 24 installed side-by-side, until the faces of the opposite edges are fully locked together.

Needless to say, other appropriate methods of elastic recall, for example, point source methods installed at regular intervals in elastic or spring materials or other.

In the case of the vehicle on tires, guidance is effected by the ground level guidance assembly 8, for example, using a central monorail guidance system.

For reasons of additional safety and watertightness, the ground level guidance assembly 8 or the ground level collection assembly 27 alone in the case of a non-guided vehicle or one which is a guided otherwise, will be covered by a permanent protection 28 at ground level, which can be opened by the blade or otherwise, for example by the vehicle's guidance assembly, and which closes after the passage of the collection blade by the blade itself, or by another means. This permanent protection 28 at ground level forming a water-tight covering must, however, be sufficiently rigid to support, without opening or buckling under, the weight of any vehicle, for example, at a level crossing.

This ground level protection 28 could, for example, be made in the form of two linear slats or wings that overlapped or not in the middle. Advantageously, the slats or wings could open due to the action of the front part of the blade and then be locked fully closed by the simple effect of elastic recall.

This permanent protection at ground level 28 also provides watertightness against the runoff of water toward the electrical contacts.

In the case of any vehicle, whether guided or not, other than a vehicle on tires guided by a central monorail, for example, a rail vehicle, the ground level guidance assembly by monorail does not exist. In this case, it is the ground level collection assembly, or the one installed flush with the ground that will have the permanent protection 28.

When the implementation includes a ground level guidance assembly 8 like the one represented, it is this ground level guidance assembly 8 which is covered by the permanent ground level protection 28.

Advantageously, it can be envisioned that the upper surface of the carrier has the insulation coverage which opens with the passing of the blade.

The functioning of the electrical energy capturing safety system according to the invention flows in an obvious manner from the preceding description.

In the absence of a vehicle, the elastic recall elements force the two holding fixtures 23 and 24 to close against one another until the opposite edge faces are fully locked together, thus impeding access to the polar parts 19 and 20 under voltage. If it is present, the ground level permanent protection 28 is in the closed position, thereby providing an additional level of safety.

When the vehicle passes, the collection blade 10 or another means ahead of it, opens the permanent ground level protection 28 automatically and spreads the two holding fixture sections 23 and 24 locally as the vehicle advances, in such a way as to maintain continuous electrical contact with polar parts 19 and 20. The conducting parts of the blade 10 are kept in permanent electrical contact sliding along these linear polar parts as a result of the compression force exercised by the elastic recall elements 25 and 26.

After the vehicle passes, the ground level permanent protection 28 closes again, and the elastic recall elements 25 and 26 push on the holding fixtures 23 and 24 until the interior space of the trough 21 is sealed.

Within the overall process of normal vehicle functioning, the system for collecting electrical energy at ground level according to the invention is designed so that the collection blade 10 is inserted into position at the beginning of the line, and will not come out again before the end of the line. However, the system according to the invention is sufficiently flexible and offers a sufficient degree of play to allow the extraction of the collection blade from the entire line by lifting it, for example in the case of a breakdown or in the event that a vehicle safety device is activated.

The methods described above can vary in their form without deviating from the scope of the invention.

Thus, for example, the collection assembly 9 is supported by the trough 21 opened upward, but it could just as well be nearly totally closed permanently by means of removable stops, except for a central slot for the passage of the collection blade 10 as is shown in the drawings.

In the case of the application of the collection system according to the invention to a public transportation fixed guideway vehicle on tires using a central guide rail, the lower support section 21 of the collection assembly 9 will preferably be buried under the central guide rail and the collection blade 10 to then advantageously be carried by the vehicle's guidance assembly.

The ground level energy collecting device according to the invention can be connected to a ground level controller, but also to an assembly guided by the monorail for the electrical feed of a vehicle that is guided in another manner.

Figure 2:
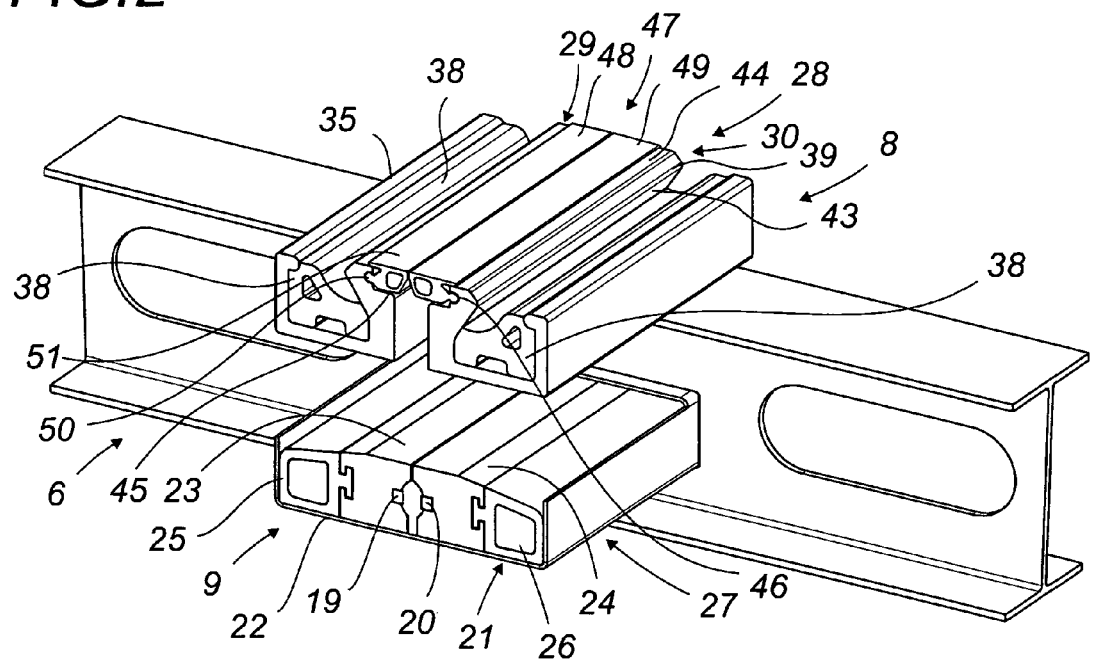
FIG. 2 is an identical view to that of FIG. 1 without the collection blade.

The ground level energy collecting device according to the invention is shown as being connected to a ground level control assembly, of which one method of implementation represented in FIGS. 1 and 2 consists of a guidance device formed of two side-by-side identical and symmetrical guidance semi-rails 29 and 30, spaced transversally from one another by a distance sufficient to allow a free flat space for the passage of collecting blade 10, without the risk of electrical contact with one or the other of the two semi-rails 29 and 30.

The two semi-rails 29 and 30 being identical, it is sufficient to describe one of them. According to the variation represented, each semi-rail 29 or 30 has a transversal shape in the general form of a U comprised of a rail riser wing 31 ending at the top in a rail conformation 32, a bottom 33 and a longitudinal return towards the top forming a lateral wall 34 terminating in an upper edge 35 which turns back towards the interior. The rail riser wing 31 is comprised of a thick core 36 and a head 37 presenting in cross-section the shape of a hook. The space located between the thick core 36 and the corresponding lateral wall 34 is occupied by a flexible filler joint 38 with a hollow tubular body encased between the wall and the upper edge 35 that returns towards the interior.

The guide rails are affixed to each cross member 6, for example, by bolting.

Figure 3:
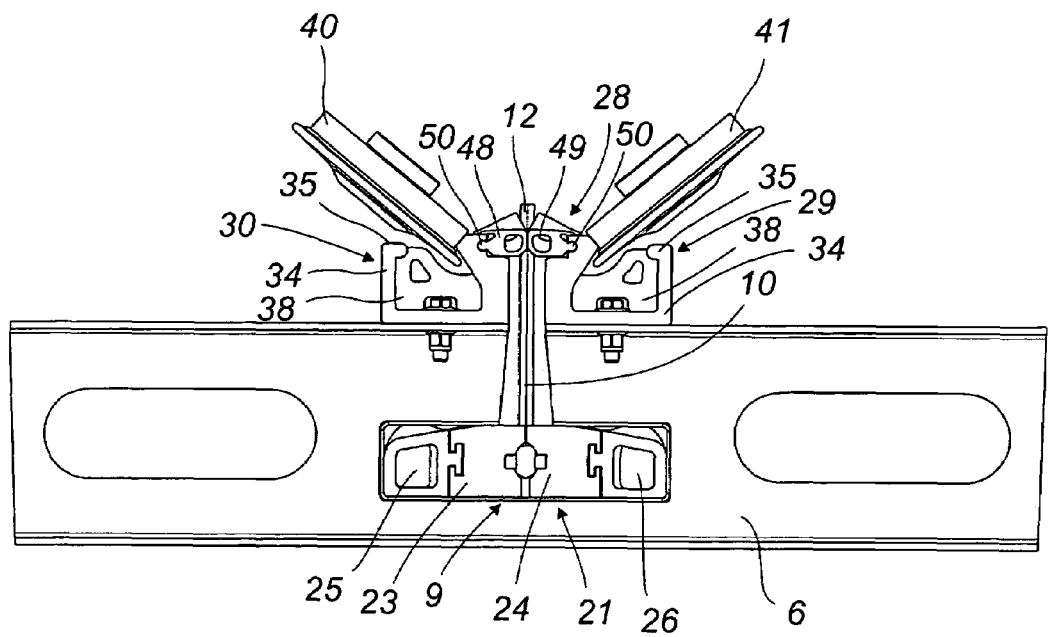
FIG. 3 is a cross-section view of FIG. 1.
Figure 4:
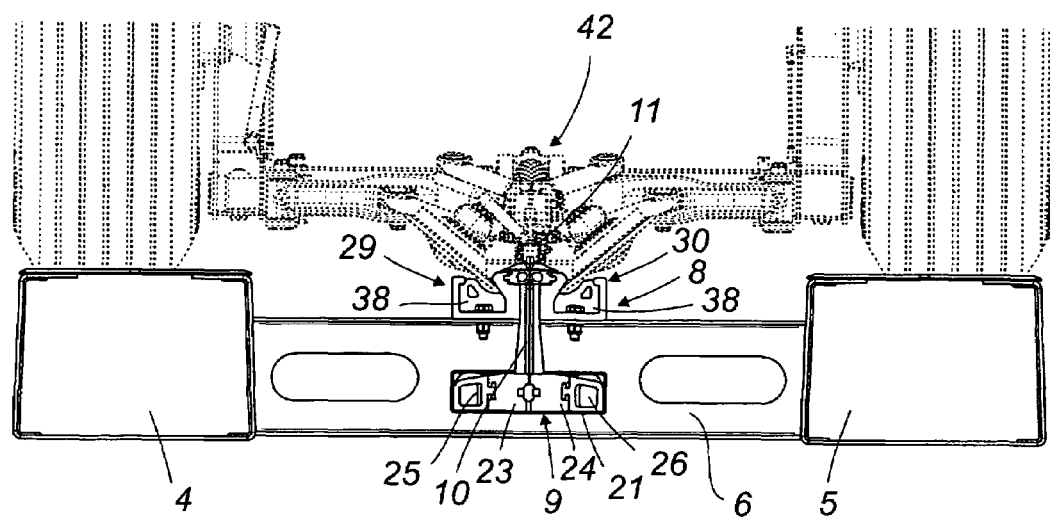
FIG. 4 is a general cross-section view of the lane showing by means of dotted lines the lead train of the guided vehicle with its guidance assembly inclined in support on the guide rail.
Figure 5:
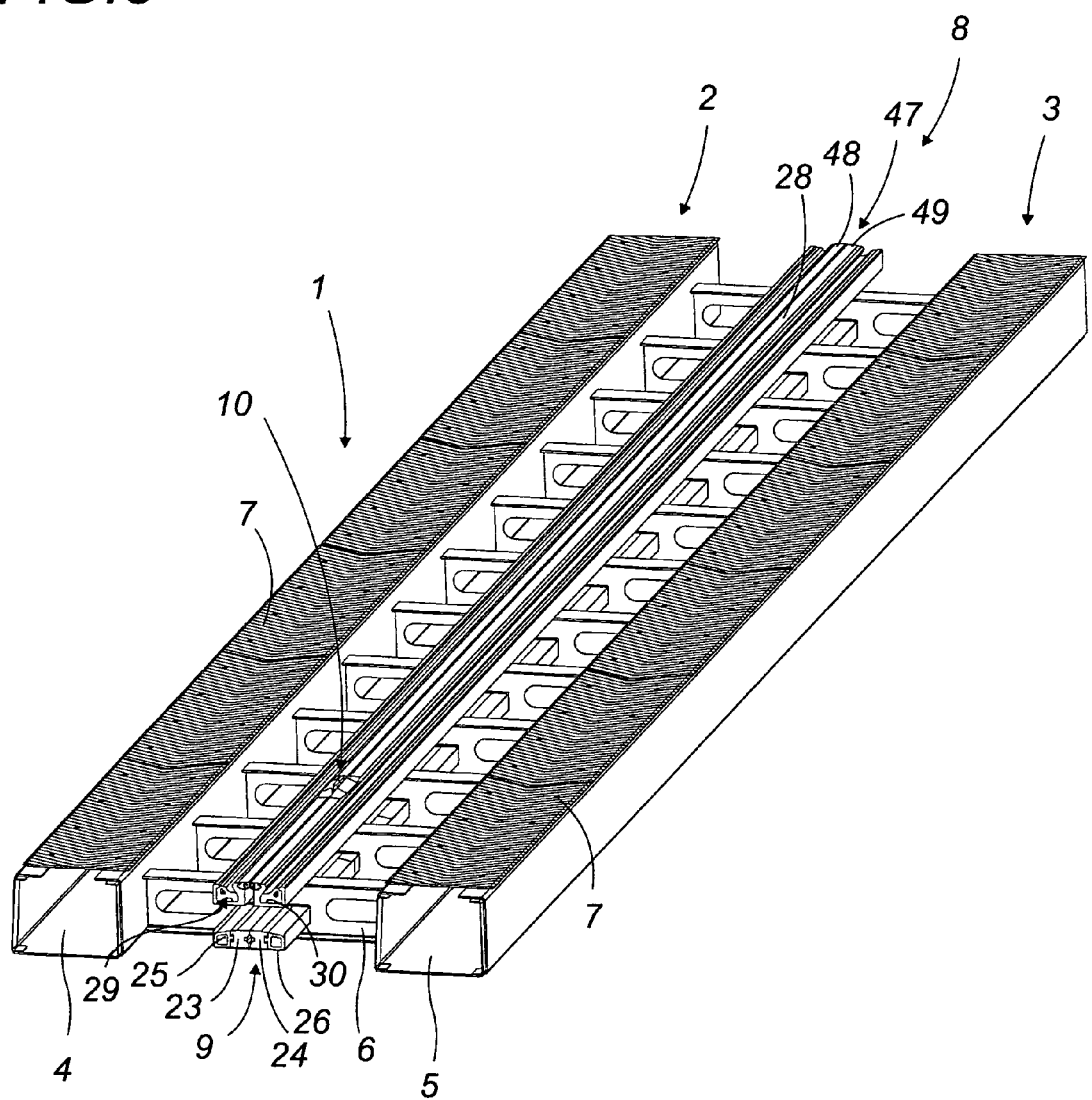
FIG. 5 is a schematic perspective view of a segment of length of the lane shown from a certain distance the deformation of the protection and watertightness joint between the two guidance semi-rails.

More precisely, the conformation (shape) of the rail 32 consists of the external side of a linear ridge formed by a rolling track 39, on the load-bearing surface of which rolls one of the two guide rollers 40 and 41 (FIGS. 1, 3 and 4) of the vehicle's guidance assembly 42, this track being flared downward by an inclined ramp 43, and on the other side by a flat, horizontal edge 44. On the inside, the conformation is particular. It consists of a flat, horizontal abutment edge 45, followed by a perpendicular edge which creates a middle reception throat 46. This conformation constitutes the receiving surface for an inter-rail linear composite water-tight joint 47, which constitutes in this variation, the permanent ground-level cover 28. This composite joint 47 is divided into two identical and symmetrical horizontal joints 48 and 49 that can be raised by the passage of the collection blade 10 as represented in FIG. 1. The two joints 48 and 49 are immobilized flat at rest, edge to edge and right up against the flat, horizontal abutment edge 45 of the head 37 of the corresponding semi-rail 29 or 30, as represented in FIG. 2. each joint 48 or 49 has a hollow, tubular volume in the proximity of the opposite edges to give it a certain level of flexibility to deformation. The opposite edge consists of a longitudinal tongue 50 and an upper lip 51 as represented in FIGS. 1 and 2. The longitudinal tongue 50 occupies the middle reception throat 46 of the corresponding semi-rail 29 or 30 and the upper lip 51 bearing down on the upper flat horizontal edge of the corresponding semi-rail 29 or 30. This association of shapes which are combined with the elasticity of joint 48 or 49 constitutes the functional equivalent of an articulation enabling each joint 48 or 49 to raise locally on passage of the collection blade 10 by turning on the deformation of each joint at the level of its tab 50 and its longitudinal lip 51 in proximity to the blade 10 as represented in FIG. 1, and closing up again behind the blade due to the effect of elastic recall.

The invention claimed is:

1. A reinforced safety device for collecting electrical energy at ground level for a land-borne ground level electrical feed vehicle by a sliding contact with at least one polar part, the safety device comprising:

a collection blade (10) having a vehicle support holder (11) on an upper part of the collection blade (10);

the blade (10) being configured to be raised by a raising device and to be connected to a feed circuit of the vehicle, the blade (10) being electrically insulated from ground and any lane structures, a part of the blade (10) being configured to spread apart two profile holding fixtures (23, 24), which are placed side-by-side facing each other opposite to one another, the two profile holding fixtures (23, 24) run either on the ground or in the ground along a lane, and are supported by a profile carrier support (21) having a bottom that is approximately flat and two lateral walls to form a collection assembly (9), the blade (10) has at least one surface (17, 18) that is maintained in direct sliding electrical contact along one of conductors or conducting parts (19, 20) which are supported by said profile holding fixtures (23, 24), each of the profile holding fixtures (23, 24) is provided with at least one elastic restoring return (25) to urge a respective one of the profile holding fixtures (23, 24) towards the other one of the profile holding fixtures (23, 24) by elastic compression engendering locally an elastic restoring force to urge the profile holding fixtures (23, 24) together after lateral compression.

2. The reinforced safety device for collecting electrical energy at ground level according to claim 1, wherein the at least one of an elastic restoring return (25) engendering locally the elastic restoring force for at least one of the two profile holding fixtures (23, 24) is a tubular elastic profile body (25, 26) that is subjected to lateral compression and is housed in a space located between the profile holding fixture (23, 24) and the corresponding lateral wall of the profile carrier support (21) of the collection assembly (9).

3. The reinforced safety device for collecting electrical energy at ground level according to claim 1, wherein a body of the blade (10) is a flat piece (12) with a forward beveled edge (14) and a lower extremity in a form of a bulge in a shape of a longitudinal block (15), the longitudinal block (15) has two flat lateral edges (17, 18), and at least one of the two flat lateral edges (17, 18) is in sliding contact with one of the facing conductor or conducting part (19, 20) supported by the corresponding profile holding fixture (23, 24).

4. The reinforced safety device for collecting electrical energy at ground level according to claim 1, wherein each conductor (19, 20) is connected to a different electrical phase and feeds the blade (10) via two electrical pathways.

5. The reinforced safety device for collecting electrical energy at ground level according to claim 4, wherein the collection blade (10) is a composite structure with two different conducting parts that are insulated from one another and are each connected to a different electrical phase.

6. The reinforced safety device for collecting electrical energy at ground level according to claim 1, wherein the profile holding fixtures (23, 24) are made of a flexible insulating material so as to permit a gap for clear passage of the blade (10).

7. The reinforced safety device for collecting electrical energy at ground level according to claim 1, wherein each of the conductors (19, 20) is inserted into a slot provided in a cavity along a surface of one of the profile holding fixtures (23, 24), which faces the other one of the profile holding fixtures (23, 24).

8. The reinforced safety device for collecting electrical energy at ground level according to claim 1, wherein the profile carrier support (21) is buried and the surface of the ground is protected, at the surface of the ground, by a protection (28) in a shape of an insulating cover that is opened by passage of the blade (10), and the insulating cover closes after the blade (10) passes thereby.

9. The reinforced safety device for collecting electrical energy at ground level according to claim 1, wherein an upper surface of the profile carrier support (21) is equipped with a protection (28) in the shape of an insulating cover that opens with the passage of the blade (10) and closes after the blade (10) passes thereby.

10. The reinforced safety device for collecting electrical energy at ground level according to claim 1, wherein the land-borne ground level electrical feed vehicle is guided by a central rail of a guidance assembly at ground level (8).

11. The reinforced safety device for collecting electrical energy at ground level according to claim 1, wherein the blade (10) is connected to a guidance arm (42) of the vehicle.

12. The reinforced safety device for collecting electrical energy at ground level according to claim 1, wherein the safety device further comprises a guide rail having two semi-rails (29, 30) installed side-by-side, and a guide roller (40, 41) of a guidance assembly (42) of the vehicle rolls on each of the two semi-rails (29, 30).

13. The reinforced safety device for collecting electrical energy at ground level according to claim 12, wherein each of the two semi-rails (29, 30) has a general transverse shape in the form of a U consisting of a rail riser wing (31) terminated at a top in a rail conformation (32), a base (33) and a longitudinal return toward the top forming a lateral wall (34) which terminates in an upper edge (35) that turns back toward an interior.

14. The reinforced safety device for collecting electrical energy at ground level according to claim 13, wherein the rail riser wing (31) has a thick core (36) and a head (37) which, when viewed in cross-section, has a shape of a hook and comprises, on an external side, a linear projection formed of a rolling track (39) on which rolls a load bearing surface of one of the guide rollers (40, 41), the rolling track (39) is bordered sloped toward a bottom with an inclined ramp (43) and on an other side, with a flat, horizontal edge (44) and on an inner side, the conformation consists of a flat horizontal abutment edge (45) followed by a perpendicular edge with a middle receiver slot (46), the conformation constituting a reception surface for a linear watertight joint (47).

15. The reinforced safety device for collecting electrical energy at ground level according to claim 14, wherein a space between the lateral wall and the thick core (36) is filled by a flexible joint (38) which has an inclined upper face, the flexible joint (38) is immobilized between these walls and an upper edge (35) turns back toward an interior.

16. The reinforced safety device for collecting electrical energy at ground level according to claim 12, wherein the collection blade (10) traverses the guide rail and a composite joint (47), two parts of the composite joint (47) spread apart or are raised locally when the blade (10) passes, and recoil after passage of the blade (10).

17. The reinforced safety device for collecting electrical energy at ground level according to claim 16, wherein the composite joint (47) is formed from two linear joints (48, 49) which are installed in a side-by-side manner such that their edges meet with one another in a middle section of the composite joint (47), and opposite extremities of two linear joints (48, 49) constitute a linear pivoting articulation with a facing conformation of an extremity of the corresponding semi-rail (29, 30).

18. The reinforced safety device for collecting electrical energy at ground level according to claim 1, wherein the land-borne ground level electrical feed vehicle is guided by the reinforced safety device for collecting electrical energy which comprises a guide rail.

19. The reinforced safety device for collecting electrical energy at ground level according to claim 1, wherein the land-borne ground level electrical feed vehicle is guided by other than the reinforced safety device for collecting electrical energy.

20. A reinforced safety device for collecting electrical energy at ground level for a land-borne ground level electrical feed vehicle by a sliding contact with at least one polar part, the safety device comprising:

a collection blade (10) having a vehicle support holder (11) on an upper part of the collection blade (10);

the blade (10) being configured to be raised by a raising device and to be connected to a feed circuit of the vehicle, the blade (10) being electrically insulated from ground and any lane structures, a part of the blade (10) being configured to spread apart two profile holding fixtures (23, 24), which are placed side-by-side facing each other opposite to one another, the two profile holding fixtures (23, 24) run either on the ground or in the ground along a lane, and are supported by a profile carrier support (21) having a bottom that is approximately flat and two lateral walls to form a collection assembly (9), the blade (10) has at least one surface (17, 18) that is maintained in sliding electrical contact along one of conductors or conducting parts (19, 20) which are supported by said profile holding fixture (23, 24), each of the profile holding fixtures (23, 24) is provided, along an entire length, with elastic restoring return towards the other adjacent holding fixture by at least one elastic compressible device engendering locally an elastic restoring force to urge the profile holding fixtures (23, 24) together after lateral compression;

the elastic compressible device engendering locally the elastic restoring force for at least one of the two profile holding fixtures (23, 24) is a tubular elastic profile body (25, 26) that is subjected to lateral compression and is housed in a space located between the profile holding fixture (23, 24) and the corresponding lateral wall of the profile carrier support (21) of the collection assembly (9).

* * * * *